United States Patent
Hagiwara et al.

(10) Patent No.: US 7,422,762 B2
(45) Date of Patent: Sep. 9, 2008

(54) PROCESS FOR PRODUCING SOYBEAN POWDER

(75) Inventors: Miyuki Hagiwara, Kanagawa (JP); Yasufumi Shibata, Yokohama (JP)

(73) Assignee: Safe-Tech International Kabushikikaisha, Kanagawa (JP)

( * ) Notice: Subject to any disclaimer, the term of this patent is extended or adjusted under 35 U.S.C. 154(b) by 0 days.

(21) Appl. No.: 10/533,267

(22) PCT Filed: Oct. 29, 2003

(86) PCT No.: PCT/JP03/13878

§ 371 (c)(1), (2), (4) Date: Apr. 28, 2005

(87) PCT Pub. No.: WO2004/043167

PCT Pub. Date: May 27, 2004

(65) Prior Publication Data

US 2006/0013937 A1    Jan. 19, 2006

(30) Foreign Application Priority Data

Oct. 30, 2002    (JP) .............................. 2002-316821

(51) Int. Cl.
*A23L 1/20* (2006.01)
(52) U.S. Cl. ...................... 426/459; 426/634; 426/285
(58) Field of Classification Search ................. 426/634, 426/459, 285
See application file for complete search history.

(56) References Cited

U.S. PATENT DOCUMENTS

| | | | | |
|---|---|---|---|---|
| 3,607,743 A | * | 9/1971 | Visser et al. ................. 210/712 |
| 3,642,490 A | * | 2/1972 | Hawley et al. ............... 426/459 |
| 3,729,327 A | * | 4/1973 | Linn et al. ..................... 99/467 |
| 6,426,112 B1 | * | 7/2002 | Boatright ...................... 426/634 |

FOREIGN PATENT DOCUMENTS

| | | |
|---|---|---|
| JP | 59-179045 | 10/1984 |
| JP | 7-185372 | 6/1995 |
| JP | 8-196228 | * 8/1996 |
| JP | 9-191848 | * 7/1997 |
| JP | 11-332496 | 12/1999 |
| JP | 2000-70741 | 3/2000 |

OTHER PUBLICATIONS

Tetsufumi Sakai et al. "Daizu no Teimisei Kaizen no tame no . . . ", Breeding research, Oct. 7, 2001, vol. 3, No. 2, p. 231.

* cited by examiner

*Primary Examiner*—Anthony Weier
(74) *Attorney, Agent, or Firm*—Muramatsu & Associates

(57) ABSTRACT

Lipoxygenase-free soybean grains are mechanically pulverized into fine particles and then subjected to heat drying treatment with water vapor having a temperature in the range of 130 to 250° C. under atmospheric pressure to form lumps of soybean powder. The lumps are formed into granules having controlled sizes by placing the lumps in a space defined by two plates having a predetermined distance therebetween and having a plurality of parallel grooves formed in the surfaces. The plates are in a state of relative rotation. This method allows the production of soybean powder free from disagreeable odor and taste and the production of soybean milk from the soybean powder, with inexpensive equipment in a quick process.

4 Claims, 8 Drawing Sheets

PROCESS FOR PRODUCING SOYBEAN POWDER

This application claims the benefit of foreign filing priority based on Japanese Patent Application No. 2002-316821, filed Oct. 30, 2002.

TECHNICAL FIELD

The present invention relates to methods for producing nutritious soybean powder made from whole soybeans whose flavor and taste have been improved, and particularly to a novel method for producing soybean powder which can be used in whole-bean curd, whole-soybean milk, and their related products, for enriching milk, juice, and other beverages, and in new applications of soybeans, for example, to bread, noodles, cake, cookies, and chips. The dispersibility of the resulting soybean powder in water is enhanced so that the soybean powder can be rapidly dispersed in water or blended with other powdery food in the presence of water.

BACKGROUND ART

Soybeans completely lacking lipoxygenase (hereinafter referred to as lipoxygenase-free soybeans) generate almost none of the bean odor peculiar to soybeans, and can prevent the production of lipid peroxide. The powder of lipoxygenase-free soybeans is advantageously used as soybean food material which is blended with other food material, such as wheat flour, as disclosed in, for example, Japanese Patent No. 2500350, "Method for processing soybean-processed food". Unfortunately, soybeans contain various types of constituents for flavor and taste irrespective of whether they are good or not, and source constituents of disagreeable odor and taste cannot be completely removed, even from lipoxygenase-free soybeans.

For example, a process of soybean milk production leaves a strong taste (disagreeable taste or dry mouth feel) peculiar to raw bean curd.

Normal soybeans, not species free of lipoxygenase, generate such disagreeable odor and taste more strongly. Accordingly, the removal of such odor and taste has been studied. Exemplary approaches include:
(1) physical processes, such as heat or solvent treatment;
(2) chemical processes using a chemical agent;
(3) processes for masking with other flavors or tastes; and
(4) processes for separating protein.

Among these approaches, heat treatment has been widely studied because it is relatively easy to perform. Disagreeable odors from normal soybeans are generated mainly by oxidation of soybean lipid induced by the enzyme activity of lipoxygenase, and the reaction product n-hexanal or the like is probably the causative substance of the disagreeable odor. Heat treatment is generally intended to eliminate the activity of lipoxygenase and to remove any causative substance that has already been produced. In this instance, high-temperature air or high-temperature water vapor is used as a heating medium. Special care should be taken in use of high-temperature air because it is likely to cause lipid oxidation and a side reaction which may brown the protein. On the other hand, water vapor has such a high heat-transfer efficiency as to be suitable as the heating medium.

Unfortunately, use of high-temperature water vapor of 100° C. or more requires expensive pressure-resistant equipment and makes the operation complicated.

Treatment under high-pressure conditions inevitably causes water vapor to penetrate soybeans, and thus requires an additional drying step. Consequently, the price of the product increases disadvantageously.

Soybean fine powder (having a particle size, for example, between several micrometers and several hundred micrometers) thrown into water floats on the surface of the water without sinking below the surface, due to the high surface tension. Even if the water is forcibly stirred, the powder is divided into several lumps and the lumps keep floating. In order to uniformly disperse the particles of the powder (hereinafter referred to as fine particles), stirring must be continued for a long time.

In order to solve this problem, the powder is generally subjected to granulation, in which fine particles are bound to each other with an appropriate force and form grains (hereinafter referred to as granules) having apparently larger sizes to the extent that the grains can be treated as powder. Consequently, an indefinitely large number of voids are formed between the fine particles except the binding sites. Thus, water coming into contact with the granules can penetrate the voids due to capillary action, so that the granules are rapidly impregnated with the water and sink easily.

While the granules are sinking, the appropriate bindings between the fine particles are released, so that the fine particles are uniformly dispersed to form a state that can be easily mixed with other food material.

For granulation of the powder, a variety of processes have been known, such as (1) rolling granulation, (2) extruding granulation, (3) compressing granulation, (4) pulverizing granulation, (5) stirring granulation, (6) fluidized-bed granulation, (7) spraying granulation, (8) melting granulation, (9) coating granulation, and (10) encapsulating granulation.

While it goes without saying that an appropriate granulation process is selected according to the properties of the powder material and desired products (granules), broadly adopted processes are performed such that mechanical force is appropriately applied by, for example, compression, shock, or shearing so that fine particles are bound to each other to form granules, as in the processes listed above.

In granulation of soybean powder with mechanical force to form soybean granules, oil naturally contained particularly in so-called whole soybean powder is squeezed by applying an excessive mechanical force, which consequently impairs the properties of the powder. It is therefore necessary to reduce the mechanical force as much as possible. This, however, undesirably provides granules having insufficient binding force between fine particles and inferior shape stability. Accordingly, a binder is added to enhance the binding force. Unfortunately, the binder degrades the purity of the resulting soybean product and may change the taste.

In view of the above-described circumstances, the object of the present invention is to provide a method for producing soybean powder free from disagreeable odor and taste and dispersible in water in a short process with inexpensive equipment, and a method for producing soybean milk.

DISCLOSURE OF INVENTION

A first requirement of the present invention is: (1) to use lipoxygenase-free soybeans, which inherently generate less disagreeable odor, as a raw material, and (2) to allow sufficiently high-temperature water vapor to act on the lipoxygenase-free soybeans under atmospheric pressure (about 1 atm) for a short time. (2) is particularly important. More specifically, the inventors investigated suitable conditions of heat treatment for removing disagreeable odor and taste remaining in the lipoxygenase-free soybeans simultaneously with drying (together referred to as heat drying treatment) without use of pressure-resistant equipment in spite of use of sufficiently high-temperature water vapor, while still inhibiting lipid oxidation and side reaction of the protein. In the course of this investigation, the inventors found that penetration of water vapor into soybeans is prevented under atmospheric pressure, and that on the contrary, such water vapor treatment produces effects different from the effects by high-temperature air treatment while promoting drying.

In the method for producing soybean powder of the present invention, unprocessed whole soybeans are generally used as the raw material soybean grains, but the soybeans may each be crushed into 2 to 4 pieces in order to remove the seed coats and hypocotyls. The protein in the soybean powder produced by this method contains water-soluble constituents in a similar ratio to that in unheated soybean powder. Also, the extracted oil has a similar acid value and peroxide value to that of the unheated soybean powder. In addition, the method of the present invention shows a large effect in removing disagreeable odor and taste, and this effect is most notably shown in the production of whole soybean milk and its related products.

The lipoxygenase-free soybean used herein is a species lacking all the lipoxygenases L1, L2, and L3 which are contained in normal soybeans, and registered species "L-Star" and "Ichihime" are known in Japan. Both species can be used effectively in the present invention.

The soybean powder used herein is constituted of fine particles having a weight-average particle size of about 10 to 50 μm and a maximum particle size of about 500 μm or less, broadly including products generally called soybean powder.

A second requirement of the present invention is to produce tasty granules of soybean powder by the same heat drying treatment without use of special additives. More specifically, (1) soybean powder is exposed to superheated water vapor to bind fine particles to each other in advance, and then (2) the binding is partially released by applying a weak shearing force by use of opposing flat plates with a space therebetween.

The inventors have studied granulation as well as heat denaturation of soybean protein in order to improve the taste of soybean powder. In the course of this study, the inventors found that superheated water vapor causes the fine particles of soybean powder to bind into larger lumps, and that when the lumps are placed in water, they rapidly sink and the bindings between the particles are released so that the particles are uniformly dispersed.

Since the lumps produced by the superheated water vapor have various sizes, they cannot be used as powder. It is therefore necessary to reprocess the lumps into granules having similar sizes. In the present invention, the lumps are pulverized into appropriate sizes, and then a shearing force is applied to the material placed between two opposing plates, at least one of which has grooves. Thus, similar-size granules are produced without squeezing oil out, and in which the bindings between the fine particles are partially released. The resulting granules exhibit superior dispersibility in water. The set of plates used herein refers to means having a structure in which the region between the opposing plates maintains a predetermined distance; hence, the set of plates may be a thick structure, such as a mortar.

In the granules of soybean powder produced by the method of the present invention, most of the protein has been denatured and physiologically harmful substances in the soybeans have been completely inactivated. The granules may therefore be added to beverages, such as milk, juice, soup, and sauce, to be ingested without being heated.

The processes described in the first and second requirements perform heat drying treatment by contact with sufficiently high-temperature water vapor. The sufficiently high-temperature water vapor is produced by reheating water vapor from boiling water of 100° C. under atmospheric pressure, and generally has a temperature in the range of 130 to 250° C. For the reheating, it is advantageous to use a metal plate heated by electromagnetic induction as a heat source from the viewpoint of ease of temperature control. The resulting high-temperature, normal-pressure water vapor is introduced into a heat-maintaining container and used as a heating medium for the heat drying treatment. The heat drying treatment time is set in the range of 30 to 300 seconds. It goes without saying that heat drying treatment at an excessively low temperature or for an excessively short time leads to unsatisfactory results, and that treatment at an excessively high temperature or for an excessively long time can cause undesired side reactions. Consequently, such conditions hinder the production of satisfactory products.

In order to apply the present invention effectively, it is preferable that the treatment is generally performed at a sufficiently high temperature much beyond 100° C. for a shorter time. More specifically, a more preferred temperature is in the range of 160 to 230° C., and a more preferred time is in the range of 60 to 180 seconds.

Since the soybean grains in the first requirement and the fine powder in the second requirement after the heat drying treatment do not contain water vapor, and are, on the contrary, well dried, they can be sent to a pulverization or granulation step immediately after cooling. Pulverization is performed on the soybean grains by applying mechanical force, such as compressing force, impact force, or shearing force. In this instance, special care needs to be taken to prevent lipid (oil) separation and lipid oxidation and deterioration. Preferably, compressing force is avoided from the viewpoint of preventing lipid separation. In use of impact force and shearing force, lipid oxidation and degradation resulting from an increase in temperature must be prevented. According to the experience of the present inventors, a rotating mortar mainly using shearing force, equipped with a cooling mechanism can provide sufficiently fine and high-quality powder.

The apparatus for forming granules is also based on the principle of the rotating mortar. In the present invention, two plates having grooves in their surfaces (opposing surfaces of the mortar) are disposed at a predetermined distance without contacting each other. One of the plates is rotated (or is allowed to stand in a state of relative rotation by, for example, varying the rotational speeds of the two plates) to apply a shearing force to the lumps between the plates. The shearing force can be controlled by varying the distance between and the rotational speeds of the plates. The size of the granules mainly and greatly depends on the distance between the opposing plates, and also depends on the magnitude of the shearing force and the depth and pitch of the grooves. In general, the depth of the grooves is in the range of 0.20 to 0.25 mm and the pitch is in the range of 1.5 to 2.5 mm. The grooves provided in a mortar are used as passages for transmitting the shearing force and discharging the granules.

Thus, the present invention changes the properties of soybean powder simply by varying the form of the raw material without varying heat drying temperature or time.

The soybean powder produced by the method of the present invention can be broadly used as nutritionally balanced food material in fields where soybeans have been hardly used, for example, in the fields of production of bread, noodles, cake, cookies, and chips.

In the method for producing soybean milk of the present invention, soybean milk is produced from the soybean powder produced by the method of the present invention. In particular, the granules of the soybean powder can be ingested as soybean milk free from disagreeable odor and taste simply by being dissolved in water.

BEST MODE FOR CARRYING OUT THE INVENTION

Figure 1:
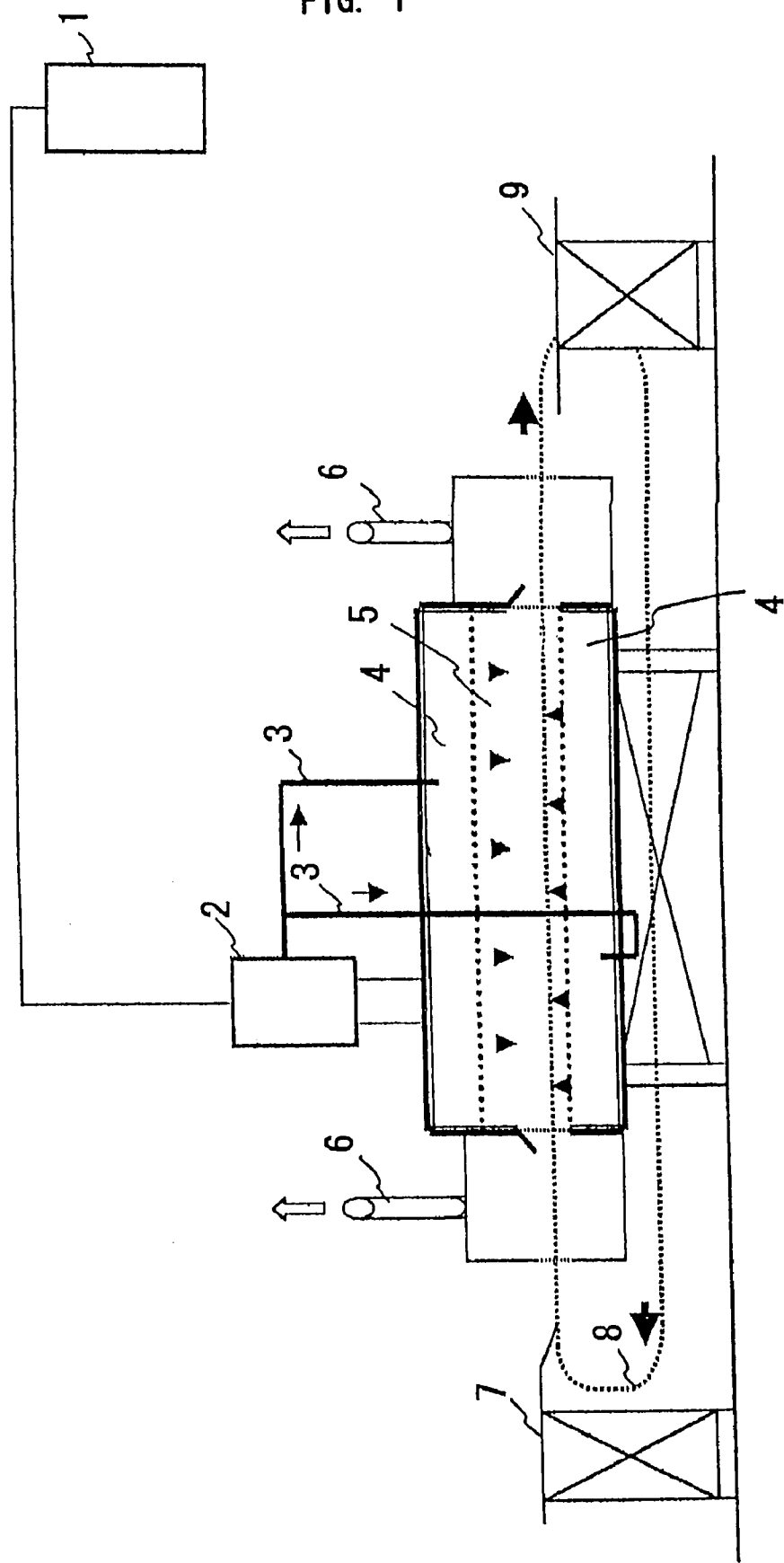
FIG. 1 is a block diagram of an apparatus used for heat drying treatment of soybean powder according to the present invention.

Heat drying treatment according to an embodiment of the present invention will now be described. FIG. 1 shows the structure of an apparatus 20 used for heat drying treatment. Superheated water vapor herein refers to unsaturated water vapor exhibiting high drying ability produced by, for example, reheating saturated water vapor generated from a boiler 1 in a water vapor heater 2. The superheated water vapor has a temperature in the range of 130 to 230° C. For the reheating of the saturated water vapor, it is advantageous in terms of temperature control to use a metal plate heated by electromagnetic induction as a heat source. Use of water vapor of a saturated or a supersaturated type with low drying ability causes excessive water to penetrate the raw material during the treatment, consequently requiring a drying step. Particularly in granulation, a strong binding force is eventually generated between the fine particles, accordingly reducing the dispersibility in water of the fine particles after granulation.

The superheated water vapor is introduced into a reservoir 4 through a superheated water vapor pipe 3, and further transmitted into a processing portion 5 through holes in a plate to come into contact with the raw material. The spent superheated water vapor is discharged out of the apparatus through water vapor outlets 6. Preferably, the treatment time is appropriately selected in the range of 30 to 300 seconds. It goes without saying that treatment at an excessively low temperature or for an excessively short time lead to unsatisfactory results, and that treatment at an excessively high temperature or for an excessively long time can cause undesired side reactions. Consequently, such conditions hinder the production of satisfactory products. In order to apply the present invention effectively, it is preferable that the treatment be generally performed at a sufficiently high temperature much beyond 100° C. for a shorter time. More specifically, a more preferred temperature is in the range of 160 to 190° C., and a more preferred time is in the range of 60 to 180 seconds.

The treatment with the apparatus shown in FIG. 1 is performed under atmospheric pressure, that is, under a condition with an extremely small difference in pressure between the outside and inside of the apparatus. It is therefore necessary to take particular care not to retain the water vapor in the apparatus. In particular, the reservoir 4 is liable to cause such retention. If the temperature decreases while the water vapor remains, the drying ability is degraded. This must be prevented. In order to induce a flow so as to prevent retention, for example, water vapor is forcibly discharged. The water vapor outlets 6 of the apparatus shown in FIG. 1 are based on a so-called natural chimney effect, each being an enforced system equipped with a motorized exhaust fan to ensure the chimney effect.

The treatment with the open-type apparatus is suitable to continuously perform production steps. Specifically, the raw material placed on a conveyer 8 from a raw material feed table 7 is subjected to the treatment while being conveyed, and then cooled down on a product receiving table 9. Water vapor does not penetrate the product. If the raw material is of fine particles, the particles bind to each other to form lumps.

The heat drying treatment of soybean grains or soybean powder has been described. Subsequently, granulation of soybean powder will now be described.

For granulation of soybean powder to form granules, fine particles of soybeans are supplied as the raw material to the apparatus 20. The fine particles are prepared with a mortar 10 shown in FIG. 2.

The mortar 10 includes an upper mortar member 11 and a lower mortar member 12. The lower mortar member 12 includes a portion having parallel grooves 13 and a portion having protrusions 14.

Figure 3:
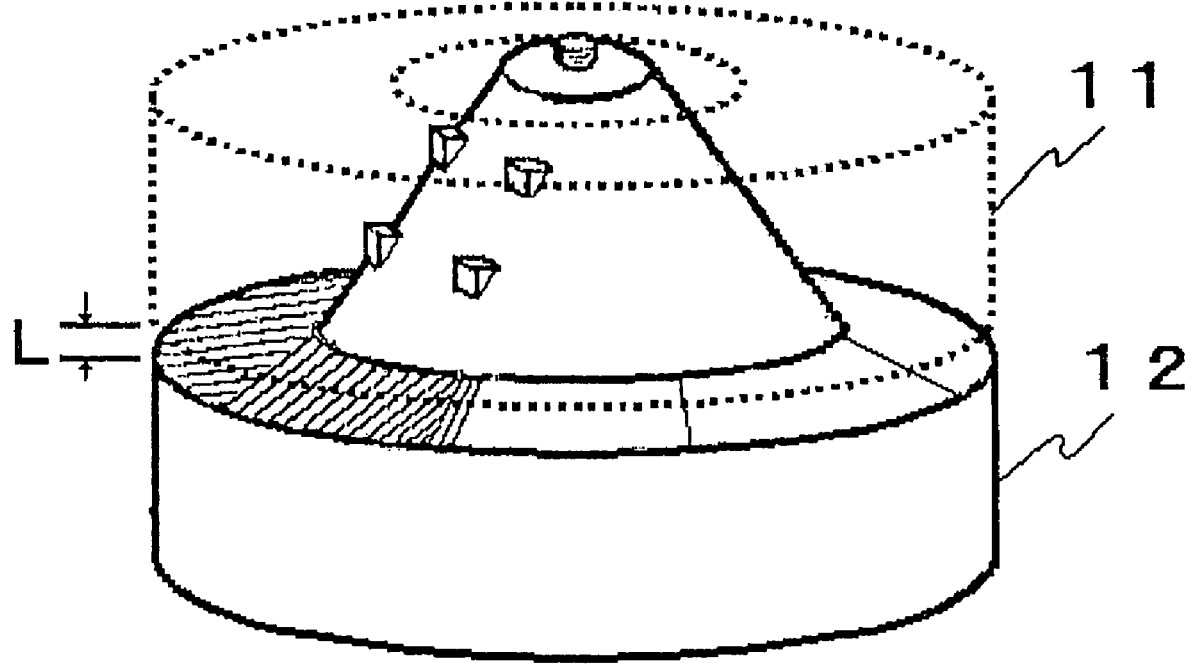
FIG. 3 is a representation of a state where the upper mortar member and the lower mortar member shown in FIG. 2 are combined.

FIG. 3 shows the state where the upper mortar member 11 covers the lower mortar member 12. The upper mortar member 11 is indicated by dotted lines. The mortar also includes a rotation driver, which is not shown.

Figure 4:
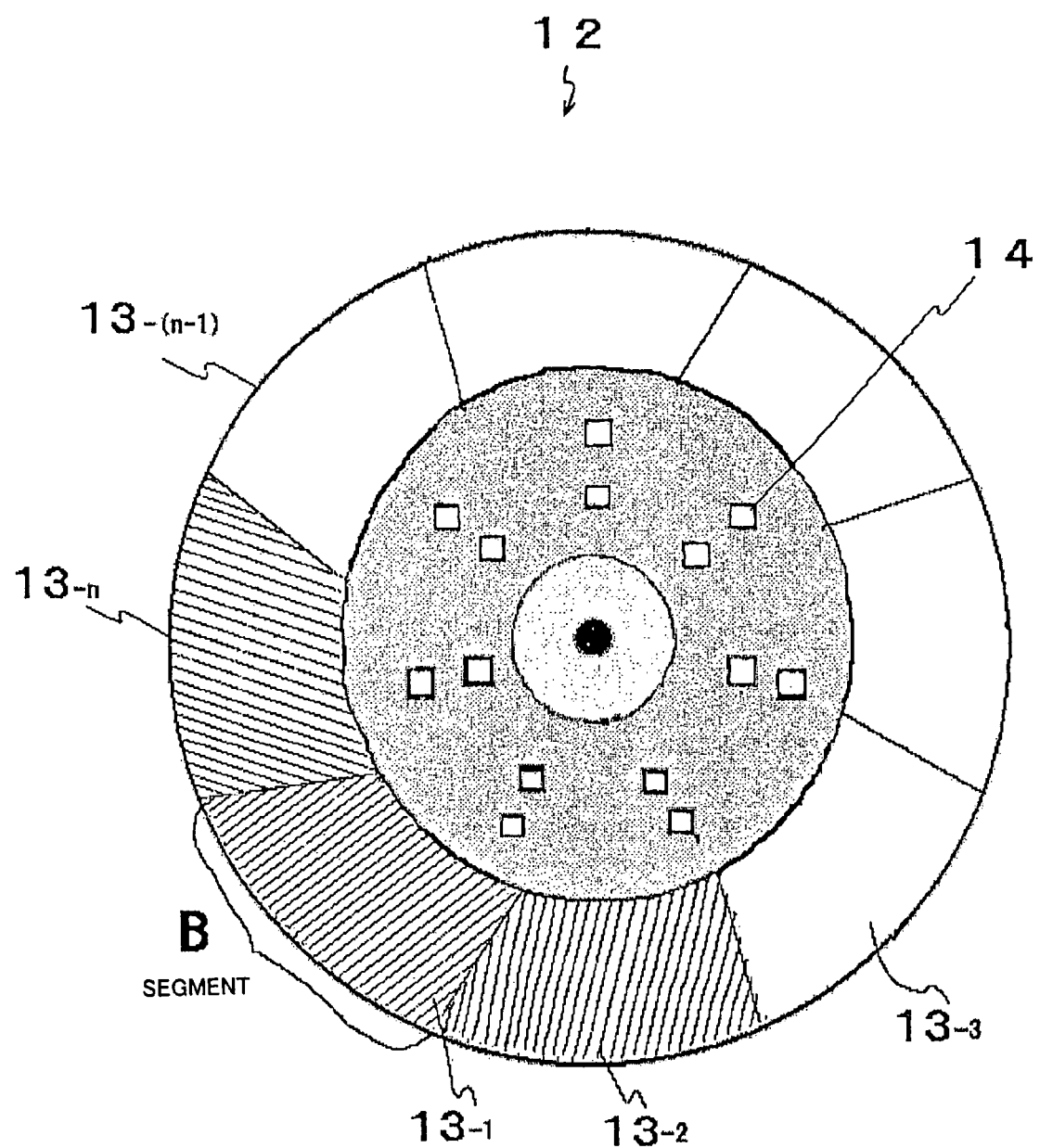
FIG. 4 is a plan view of the lower mortar member.
Figure 5:
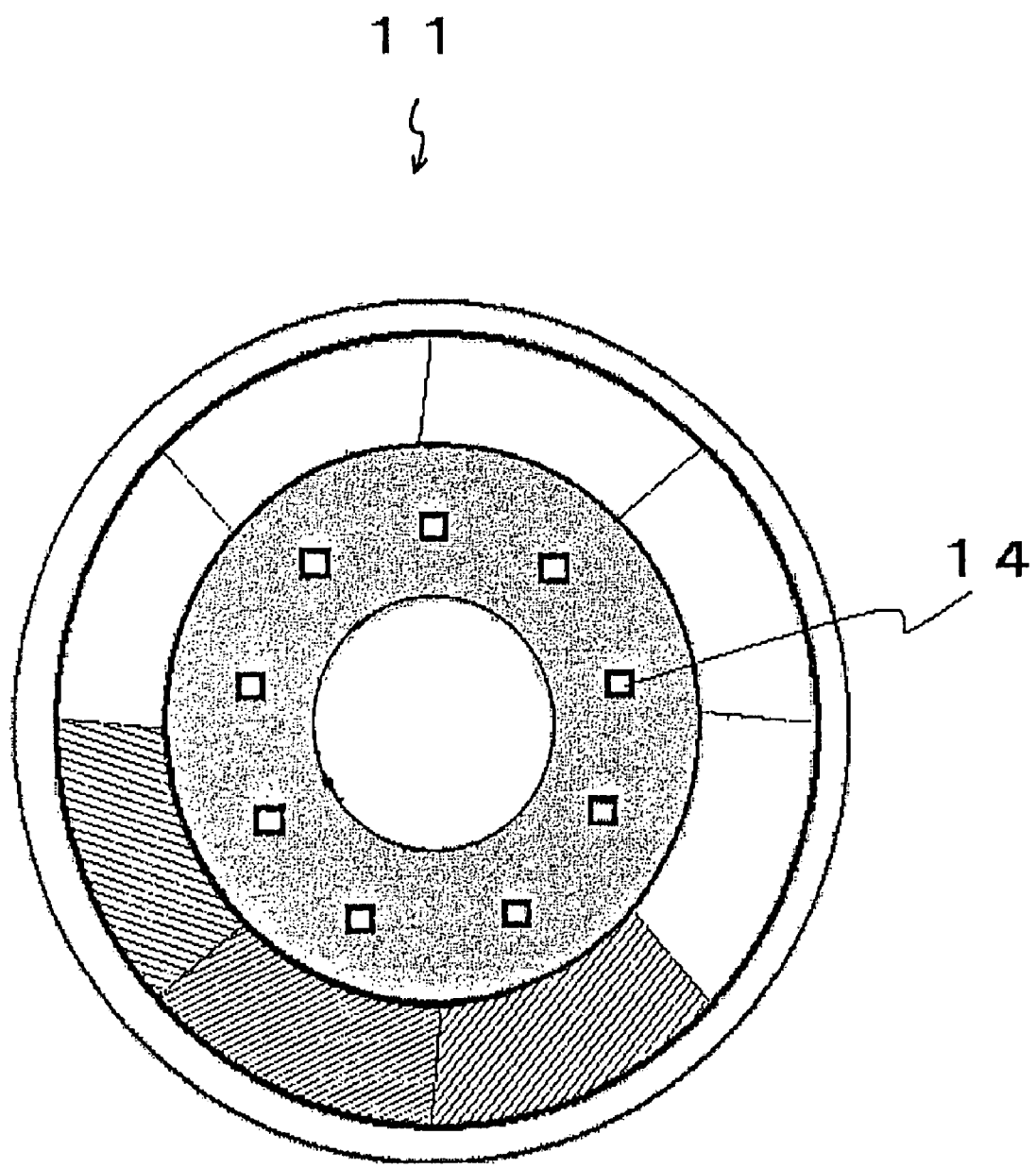
FIG. 5 is a bottom view of an upper mortar member.

FIG. 4 is a plan view of the lower mortar member 12. The lower mortar member 12 includes a plurality of segments (B) having parallel grooves 13. FIG. 5 is a bottom view of the upper mortar member 11. The upper mortar member 11 also includes a plurality of segments 13 having parallel grooves in the same manner as in the lower mortar member 12. However, the upper mortar member 11 and the lower mortar member 12 have different groove angles with respect to the axis.

Figure 2:
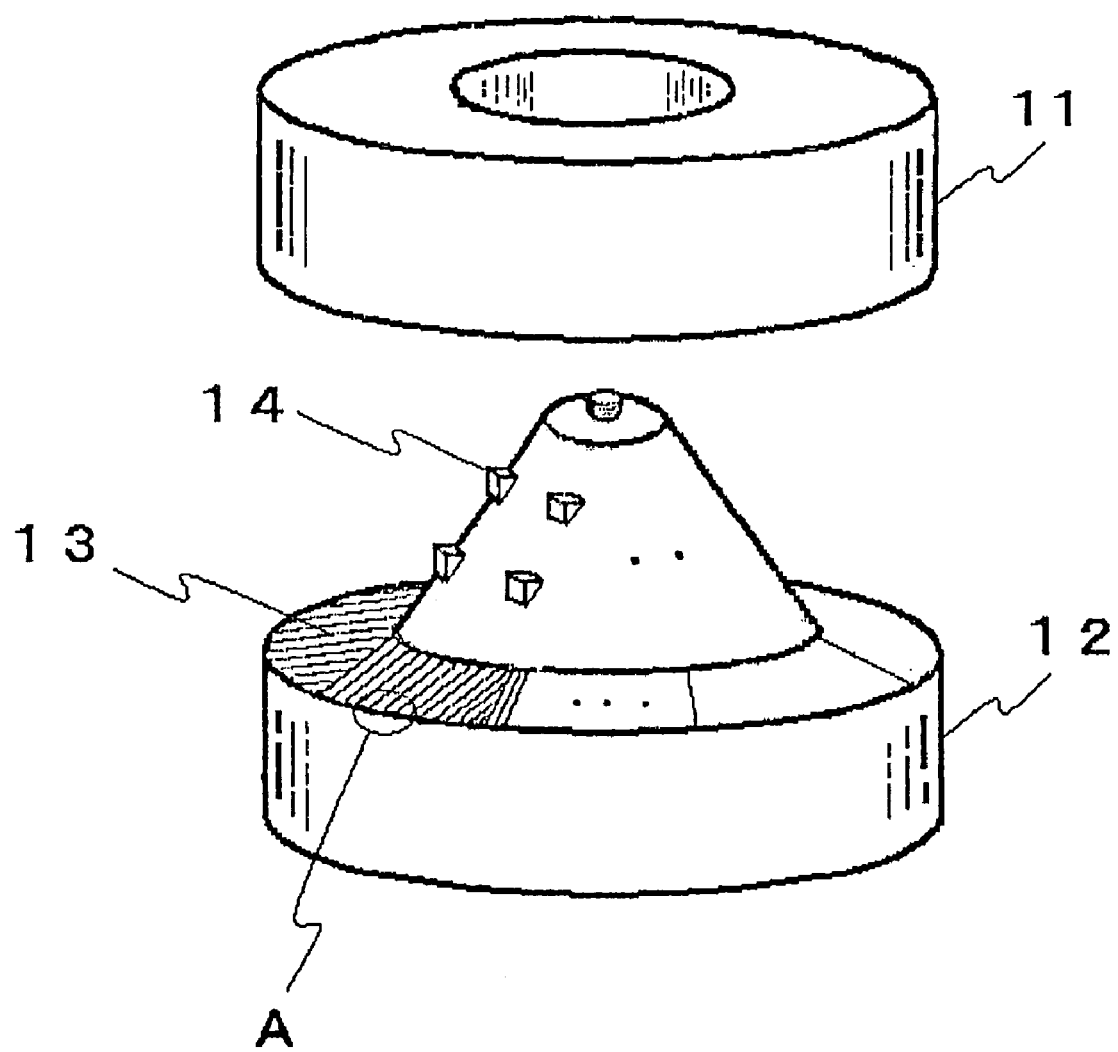
FIG. 2 is a perspective view of a mortar according to the present invention.
Figure 6:
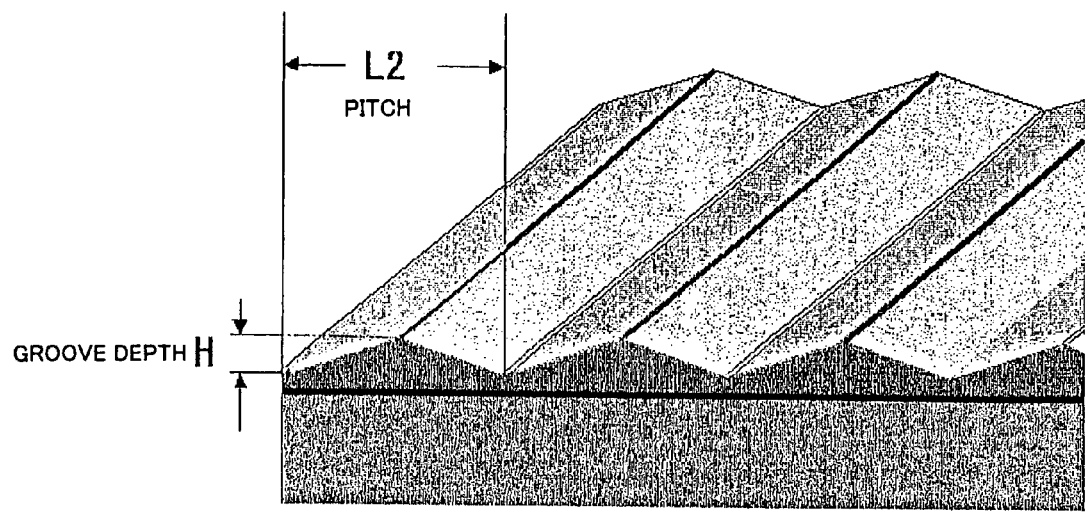
FIG. 6 is an enlarged view of portion A shown in FIG. 2.

FIG. 6 is an enlarged view of portion A shown in FIG. 2. The grooves are formed at a depth (H) of about 0.25 mm and at a pitch (L2) of about 2.0 mm.

The lumps produced by the heat drying treatment are placed in the mortar 10, and the upper mortar member 11 and the lower mortar member 12 are rotated with a predetermined distance L maintained therebetween. The distance L is set depending on the size of the granules to be produced. In general, the distance is between several tens of micrometers and several millimeters, but is not limited to this range.

Thus, soybean granular powder is produced by the granulation (step).

<Examples of the Water Dispersibility of Soybean Powder>

COMPARATIVE EXAMPLE 1

Figure 7:
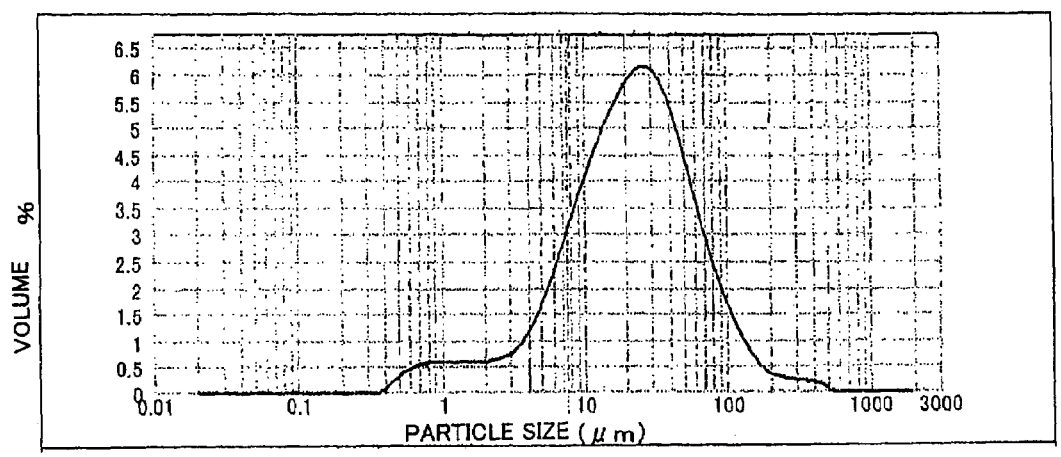
FIG. 7 is a chart of the particle size distribution of raw material soybean powder dispersed in ethanol.
Figure 8:
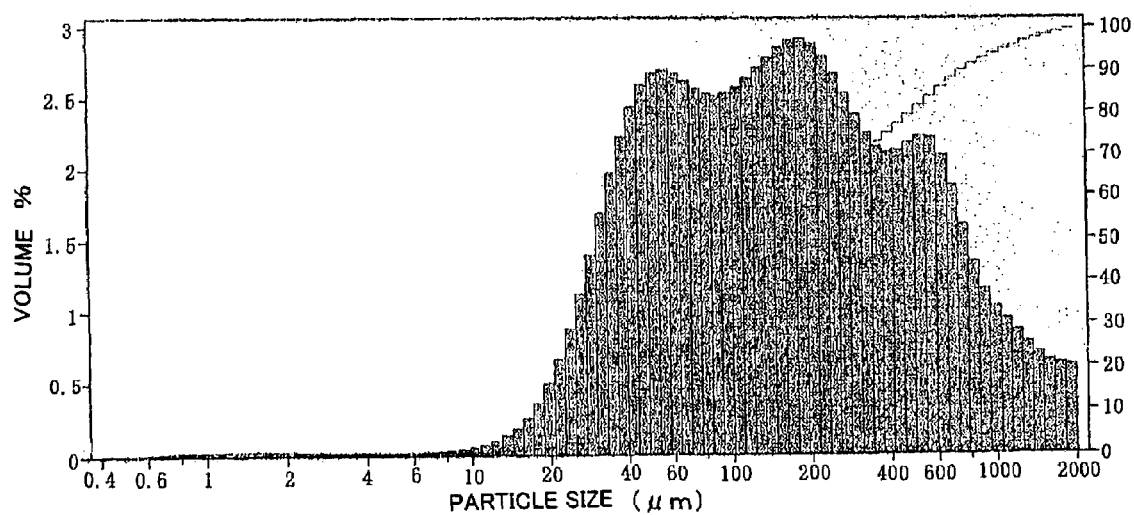
FIG. 8 is a chart of the particle size distribution of raw material soybean powder dispersed in air.

The particle size distribution of the raw material soybean powder was measured. FIG. 7 shows the results of measurement in which the soybean powder was dispersed in ethanol, and FIG. 8 shows the results of measurement in which the soybean powder was dispersed in air. The dispersion in ethanol provided substantially a single distribution structure exhibiting a large peak at a particle size of about 22 μm. On the other hand, the dispersion in air provided a plurality of distribution structures exhibiting their respective peaks at 55 μm, 185 μm, and 517 μm; the distribution structures seemed to overlap with one another. Apparently, these results suggest that the fine particles of soybean powder are present separately and independently in ethanol, and that, in air, a plurality of fine particles bind to form grains and the grains further bind to each other.

EXAMPLES 1 AND 2

Figure 9:
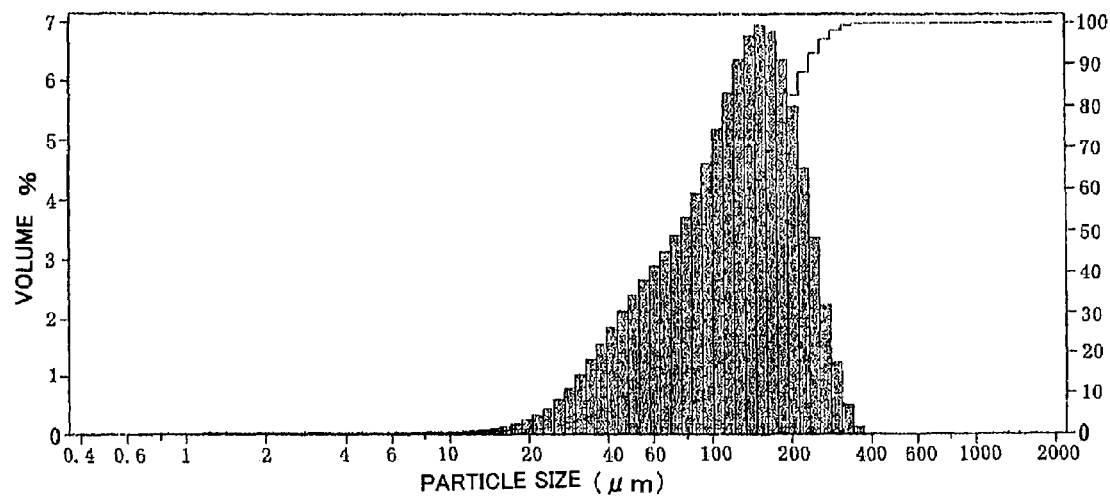
FIG. 9 is a chart of the particle size distribution after granulation.
Figure 10:
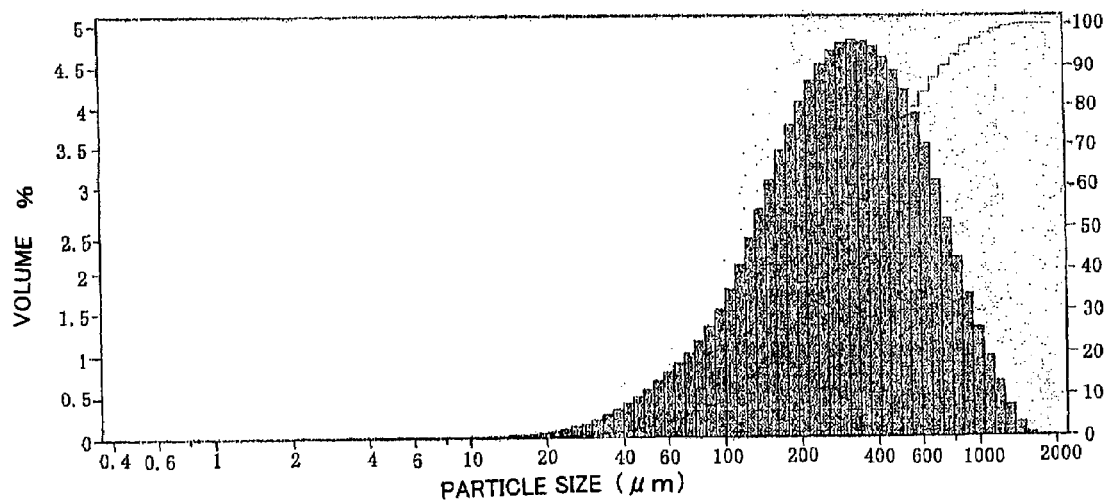
FIG. 10 is a chart of the particle size distribution after granulation in which the space of the mortar is set larger than that in FIG. 9.

The raw material soybean powder of the same lot as that used in the Comparative Example was formed into lumps by applying superheated water vapor at 190° C. for 180 seconds. The lumps were granulated with a different distance (L) between the opposing mortar members. The resulting granules were dispersed in air and the particle size distribution was measured. The results are shown in FIG. 9 (Example 1) and FIG. 10 (Example 2). Example 1 was performed with a smaller distance between the opposing mortar members; Example 2, with a larger distance. Both cases simplified the multiple particle size distribution into a single peak distribution. The peak particle size in Example 1 was about 7 times as large as that in ethanol (see FIG. 7), and the peak particle size in Example 2 was 15 times. This suggests that granulation was carried out effectively.

COMPARATIVE EXAMPLE 2 AND EXAMPLES 3 AND 4

One gram of each of the raw material soybean powder and granules produced in Example 1 or 2 was placed in water, and the time needed for the powder or granules to sink completely was measured. The raw material soybean powder was partially repelled from the water and remained on the surface of the water even after 5 minutes had elapsed (Comparative Example 2). On the other hand, the samples granulated in Examples 1 and 2 sank completely within 10 seconds (Examples 3 and 4, respectively). These results clearly show that granules produced by the method of the present invention have superior hydrophilicity.

<Examples of Tastes of Soybean Powder and Soybean Milk>

The present invention will be further described in detail with reference to a comparative example and examples, but the scope of the invention is not limited to these examples.

Soybean powders produced by the following three processes were subjected to evaluation tests.

First Production Process

Lipoxygenase-free soybean grains or crushed grains were subjected to heat drying treatment with water vapor of a temperature in the range of 130 to 250° C. under atmospheric pressure, and were then mechanically pulverized into fine particles.

Second Production Process

Lipoxygenase-free soybean grains were mechanically pulverized into fine particles, and then subjected to heat drying treatment with water vapor of a temperature in the range of 130 to 250° C. under atmospheric pressure.

Third Production Process

Lipoxygenase-free soybean grains were mechanically pulverized into fine particles, then subjected to heat drying treatment with water vapor of a temperature in the range of 130 to 250° C. under atmospheric pressure, and further granulated by placing the lumps of soybean powder formed by overheat drying treatment in the space between the opposing mortar members.

EXAMPLES NO. 1 TO NO. 5

Soybean (L-Star) powder produced by the first production process was immersed in water and allowed to stand until the soybean powder sufficiently absorbed the water (for about 16 hours). The weight of water was about 10 relative to the weight of the soybean powder. Then, the sample was filtered through cloth and heat-treated in a hot water bath for 30 minutes to yield soybean milk.

Table 1 shows heat drying conditions for lipoxygenase-free soybean powder. Five samples No. 1 to No. 5 were used. For a comparative example, fine powder of lipoxygenase-free soybean grains not subjected to heat drying treatment was used.

TABLE 1

Heat Drying Conditions for Soybean Grains

| Conditions | Comparative Example | Examples | | | | |
|---|---|---|---|---|---|---|
| | | No. 1 | No. 2 | No. 3 | No. 4 | No. 5 |
| Temperature (° C.) | untreated | 150 | 170 | 170 | 170 | 200 |
| Time (s) | | 120 | 60 | 90 | 120 | 60 |

The tastes of the resulting soybean milk samples were subjected to evaluation tests by questionnaires. Ten each of adult men and women, namely 20 people in total, were randomly selected. Table 2 shows evaluation items, criteria, and average score by the 20 people. According to this table, although all the samples used the same lipoxygenase-free soybeans, each of the soybean milk samples prepared from the soybean powder of the present invention received higher scores than the soybean milk of the comparative example. The results of the taste evaluation of the soybean milk samples are shown in Table 2.

TABLE 2

Taste Evaluation of Soybean Milk

| Evaluation item, evaluation point Soybean milk sample score | | Comparative Example | No. 1 | No. 2 | No. 3 | No. 4 | No. 5 |
|---|---|---|---|---|---|---|---|
| Bean odor | 1. Largely remaining<br>2. Little remaining<br>3. Slightly remaining | 3.2 | 4.5 | 4.7 | 4.7 | 4.6 | 4.5 |

TABLE 2-continued

Taste Evaluation of Soybean Milk

| Evaluation item, evaluation point Soybean milk sample score | | Comparative Example | No. 1 | No. 2 | No. 3 | No. 4 | No. 5 |
|---|---|---|---|---|---|---|---|
| Taste | 4. Hardly remaining<br>5. Completely removed<br>1. Bad<br>2. Rather bad<br>3. Fair<br>4. Rather good<br>5. Good | 2.5 | 4.2 | 4.5 | 4.6 | 4.3 | 4.2 |
| Comprehensive evaluation | 1. Bad<br>2. Rather bad<br>3. Fair<br>4. Rather good<br>5. Good | 2.2 | 4.2 | 4.5 | 4.6 | 4.3 | 4.2 |

Score = total evaluation points/number of testers

EXAMPLES NO. 6 AND NO. 7

A soybean powder sample of Example No. 6 was prepared by the first production process at a heat drying temperature of 170° C. for 90 seconds, and a soybean powder sample of Example No. 7 was prepared by the second production process at a heat drying temperature of 230° C. for 90 seconds. A soybean powder sample not subjected to heat drying treatment was used for a comparative example. The acid value and peroxide value of oil extracted from each sample were measured.

Table 3 shows how the heat drying treatment affects the acid value and peroxide value. According to Table 3, it is obvious that the processes of the present examples do not change the acid value and peroxide value even though heat drying treatment is applied.

TABLE 3

Effect of Heat Drying Treatment on Acid Value and Peroxide Value

| Soybean grain sample Evaluation item | Comparative Example | No. 6 | No. 7 |
|---|---|---|---|
| Acid value | 2.33 | 1.52 | 2.74 |
| Peroxide value | 0.6 meq/kg | 0.4 meq/kg | 0.5 meq/kg |

EXAMPLES NO. 8 TO NO. 10

The sample of Example No. 6 produced by the first production process was used in Example No. 8, and the sample of Example No. 7 produced by the second production process was used in Example No. 9. In addition, a soybean powder sample prepared by heat drying treatment at a temperature of 170° C. for 120 seconds was used in Example No. 10.

For a comparative example, a soybean powder sample not subjected to heat drying treatment was used. The trypsin inhibitor activity of each sample was measured and the results are shown in Table 4. The trypsin inhibitor activity in the comparative example was 57.8 TIU/mg.

The results clearly show that while the soybean powder produced by the first production process is still rawish, the soybean powder produced by the second production process exhibits low trypsin inhibitor activity and is very edible.

TABLE 4

Results of Trypsin Inhibitor Activity Measurement

| Soybean grain sample Evaluation item | No. 8 | No. 9 | No. 10 |
|---|---|---|---|
| Trypsin inhibitor activity | 34.4 TIU/mg | 20.4 TIU/mg | 21.5 TIU/mg |

EXAMPLES NO. 11 TO NO. 14

Soybean powder samples were prepared by the third production process under the conditions shown in the table below. For a comparative example, lipoxygenase-containing normal soybeans (species: Fukuyutaka) were used as the raw material. On the other hand, lipoxygenase-free soybeans (species: L-Star) were used for the examples. Each raw material was pulverized into fine particles having an average particle size of about 15 μm and a maximum particle size of about 108 μm, and water vapor of a temperature shown in the table below was applied to the particles under normal pressure for a time shown in the same table. Then, granulation was performed to adjust the particle size. The resulting granules were used for evaluation.

TABLE 5

Conditions for Soybean Powder Production

| Treatment conditions | Comparative Example | | | | | | Example | | | |
| | | | | | | | No. 11 | No. 12 | No. 13 | No. 14 |
| | a | b | c | d | e | f | | | | |
| Temperature | 130 | 150 | 170 | 190 | 230 | | 190 | | | |

TABLE 5-continued

| | Conditions for Soybean Powder Production | | | | | | | | | |
|---|---|---|---|---|---|---|---|---|---|---|
| | | | | | | | | Example | | |
| Treatment conditions | Comparative Example | | | | | | No. 11 | No. 12 | No. 13 | No. 14 |
| | a | b | c | d | e | f | | | | |
| (° C.) Time (s) | | 180 | | | 90 | 180 | 150 | 180 | 210 | 240 |

The bean odor and disagreeable taste intensities of the resulting soybean powder sample were measured by directly placing the sample in the mouth. The results are shown in Tables 6 and 7. Since the comparative examples (Table 6) were not able to remove disagreeable taste completely as well as the bean odor, most of their comprehensive evaluations were bad or rather bad ("f" was for reference and generated a strong flavor of soybean flour). In contrast, Examples (Table 7) according to the present invention did not leave disagreeable taste, and most of their comprehensive evaluations were rather good or good.

TABLE 6

Taste Evaluation Results of Removal of Bean Odor and Disagreeable Taste

| Evaluation item, evaluation point | | Comparative Example | | | | | |
|---|---|---|---|---|---|---|---|
| | Sample score | a | b | c | d | e | f |
| Bean odor Comprehensive evaluation | 1. Largely remaining Bad 2. Little remaining Rather bad 3. Slightly remaining Fair 4. Hardly remaining Rather good 5. Completely removed Good | 2.0 | 1.5 | 1.5 | 2.3 | 1.0 | 3.5 |

Score = total evaluation points/number of testers

TABLE 7

Taste Evaluation Results of Removal of Bean Odor and Disagreeable Taste

| Evaluation item, evaluation point | | Example | | | |
|---|---|---|---|---|---|
| | Sample score | No. 11 | No. 12 | No. 13 | No. 14 |
| Bean odor Comprehensive evaluation | 1. Largely remaining Bad 2. Little remaining Rather bad 3. Slightly remaining Fair 4. Hardly remaining Rather good 5. Completely removed Good | 4.0 | 5.0 | 5.0 | 4.8 |

Score = total evaluation points/number of testers

In the embodiment of the present invention, lumps produced by heat drying treatment are granulated by being placed in a mortar for producing fine particles, with the mortar space adjusted. Thus, water-dispersible granules of soybean powder are produced without use of any binder. Therefore, use of lipoxygenase-free soybean grains as the raw material results in soybean powder free from disagreeable odor and taste, suitable for cooking, and whose taste has not been degraded by the binder.

INDUSTRIAL APPLICABILITY

As described above, the present invention can efficiently produce soybean powder having less disagreeable odor and taste. In addition, soybean milk having less disagreeable odor and taste can be produced from this soybean powder.

Furthermore, the process for granulating soybean powder of the present invention does not need any additive to remain and is easy to perform. The resulting granules have a single particle size distribution structure and superior hydrophilicity, and accordingly can easily disperse in water.

The invention claimed is:

1. A method for producing soybean powder, consisting of the following steps of:
    mechanically pulverizing lipoxygenase-free soybean grains into fine particles; and
    subjecting the fine particles to heat drying treatment by solely using water vapor having a temperature in a range of 160 to 230° C. under atmospheric pressure throughout for a time range of 30 to 300 seconds.

2. A method for producing soybean powder, comprising the steps of:
    mechanically pulverizing lipoxygenase-free soybean grains into fine particles;

subsequently subjecting the fine particles to heat drying treatment with water vapor having a temperature in a range of 160 to 230° C. under atmospheric pressure throughout for a time range of 30 to 300 seconds to form lumps of soybean powder; and then forming granules having controlled sizes by placing the lumps in a space defined by two opposing plates having a predetermined distance therebetween, at least one of the plates having a plurality of substantially parallel grooves in the surface thereof, the plates being in a state of relative rotation.

3. A method for producing soybean powder, comprising the steps of:

preparing a soybean powder material which has been processed into lumps by applying superheated water vapor over fine particles of soybean under an atmospheric pressure in a temperature range of 160-230° C.; and forming granules having controlled sizes by placing the soybean powder material in a space defined by two opposing plates having a predetermined distance therebetween;

wherein each plate has a plurality of parallel grooves on a surface thereof, and at least one of the two plates is rotated.

4. The method for producing soybean powder according to claim 3, wherein the grooves have a pitch of 1.5 to 2.5 mm and a depth of 0.20 to 2.5 mm.

* * * * *